United States Patent [19]

Goff et al.

[11] Patent Number: 5,835,791
[45] Date of Patent: Nov. 10, 1998

[54] VERSATILE CONNECTION OF A FIRST KEYBOARD/MOUSE INTERFACE AND A SECOND KEYBOARD/MOUSE INTERFACE TO A HOST COMPUTER

[75] Inventors: Lonnie C. Goff; David Ross Evoy, both of Tempe, Ariz.; Franklyn Story, Chandler, Tex.

[73] Assignee: VLSI Technology, Inc.

[21] Appl. No.: 621,594

[22] Filed: Mar. 26, 1996

[51] Int. Cl.[6] .............................. G06F 15/02; H03K 17/94
[52] U.S. Cl. ..................... 395/882; 395/893; 395/500; 395/835
[58] Field of Search .................... 395/825, 838, 395/882, 500, 893, 835

[56] References Cited

U.S. PATENT DOCUMENTS

| 4,264,984 | 4/1981 | Anderson | 364/900 |
|---|---|---|---|
| 5,434,722 | 7/1995 | Bizjak et al. | 360/69 |
| 5,530,893 | 6/1996 | Sugi | 395/825 |
| 5,590,312 | 12/1996 | Marisetty | 395/500 |
| 5,610,601 | 3/1997 | Lahti et al. | 341/22 |
| 5,628,029 | 5/1997 | Evoy | 395/838 |

*Primary Examiner*—Thomas C. Lee
*Assistant Examiner*—Rehana Perveen
*Attorney, Agent, or Firm*—Douglas L. Weller

[57] ABSTRACT

A keyboard controller supports both a first keyboard/mouse interface and a second keyboard/mouse interface. Data is routed between the first keyboard/mouse interface and a first host interface when the first host interface is active. Data is routed between the first keyboard/mouse interface and a first shell when a second host interface is active. The first shell provides compatible connection between the first keyboard/mouse interface and the second host interface. Data is routed between the second keyboard/mouse interface and the second host interface when the second host interface is active. Data is routed between the second keyboard/mouse interface and a second shell when the first host interface is active. The second shell provides compatible connection between the second keyboard/mouse interface and the first host interface.

13 Claims, 9 Drawing Sheets

VERSATILE CONNECTION OF A FIRST KEYBOARD/MOUSE INTERFACE AND A SECOND KEYBOARD/MOUSE INTERFACE TO A HOST COMPUTER

BACKGROUND

This invention relates generally to personal computers and pertains particularly to a versatile keyboard controller.

Keyboard controllers for personal computers generally use an eight-bit microprocessor, such as an 8052 processor, to collect and pass data between the keyboard/mouse and a system processor, such as a Pentium processor. The interface between the system and the keyboard controller consists of two eight-bit registers (i.e., port 64/60) and two interrupt lines (IRQ1 and IRQ12). This interface was introduce with the IBM PC/AT personal computer and expanded to include the mouse in the IBM PS/2 personal computer. It is the de facto industry standard.

The universal serial bus (USB) is designed as an alternate standard to current keyboard controllers. Further, the USB is specified to interface to a multitude of device types, not just keyboards and mice. The host controller interface (HCI) to the USB controller consists of more than twenty 32-bit registers. All communication between the system processor and the USB controller is currently specified to operate at the operating system level. The system processor, via its USB driver, must perform a lengthy configuration with the USB controller before any device can become operational. For general information on the USB, see the Universal Serial Bus Specification, Revision 1.0, Jan. 19, 1996, by Compaq Computer Corporation, Digital Equipment Corporation, IBM PC Company, Intel Corporation, Microsoft Corporation, NEC and Northern Telecom.

Current implementations of USB utilize a USB controller rather than a keyboard controller. These implementations of the USB are not backwards compatible with keyboards and mice which operate with prior versions of the keyboard controller. Further, current implementations of the USB do not utilize the port 64/60, therefore application programs, such as certain game programs, which directly access port 64/60, do not work properly on a system which utilizes the USB.

SUMMARY OF THE INVENTION

In accordance with the preferred embodiment of the present invention, a keyboard controller supports both a first keyboard/mouse interface and a second keyboard/mouse interface. For example, the first keyboard/mouse interface is a universal serial bus serial interface and the second keyboard/mouse interface is a PS/2 serial interface. Data is routed between the first keyboard/mouse interface and a first host interface when the first host interface is active. For example, the first host interface is a host controller interface (HCI). Data is routed between the first keyboard/mouse interface and a first shell when a second host interface is active. The first shell provides compatible connection between the first keyboard/mouse interface and the second host interface. The second host interface is, for example, a port 64/60 interface. Data is routed between the second keyboard/mouse interface and the second host interface when the second host interface is active. Data is routed between the second keyboard/mouse interface and a second shell when the first host interface is active. The second shell provides compatible connection between the second keyboard/mouse interface and the first host interface.

In the preferred embodiment of the present invention, the second (USB) shell includes a virtual serial keyboard, a serial keyboard inbound queue, a serial keyboard outbound queue, a virtual mouse, a mouse inbound queue, and a mouse outbound queue. The second shell also includes a virtual matrix keyboard, a matrix keyboard inbound queue, and a matrix keyboard outbound queue.

Likewise in the preferred embodiment, the first shell includes a virtual keyboard, a first linked list of transfer descriptors for virtual keyboard data, a virtual mouse, and a second list of transfer descriptors for virtual mouse data.

The present invention provides for a versatile keyboard controller which supports USB keyboards and mice as well as the current industry standard.

DESCRIPTION OF THE PREFERRED EMBODIMENT

Figure 1:
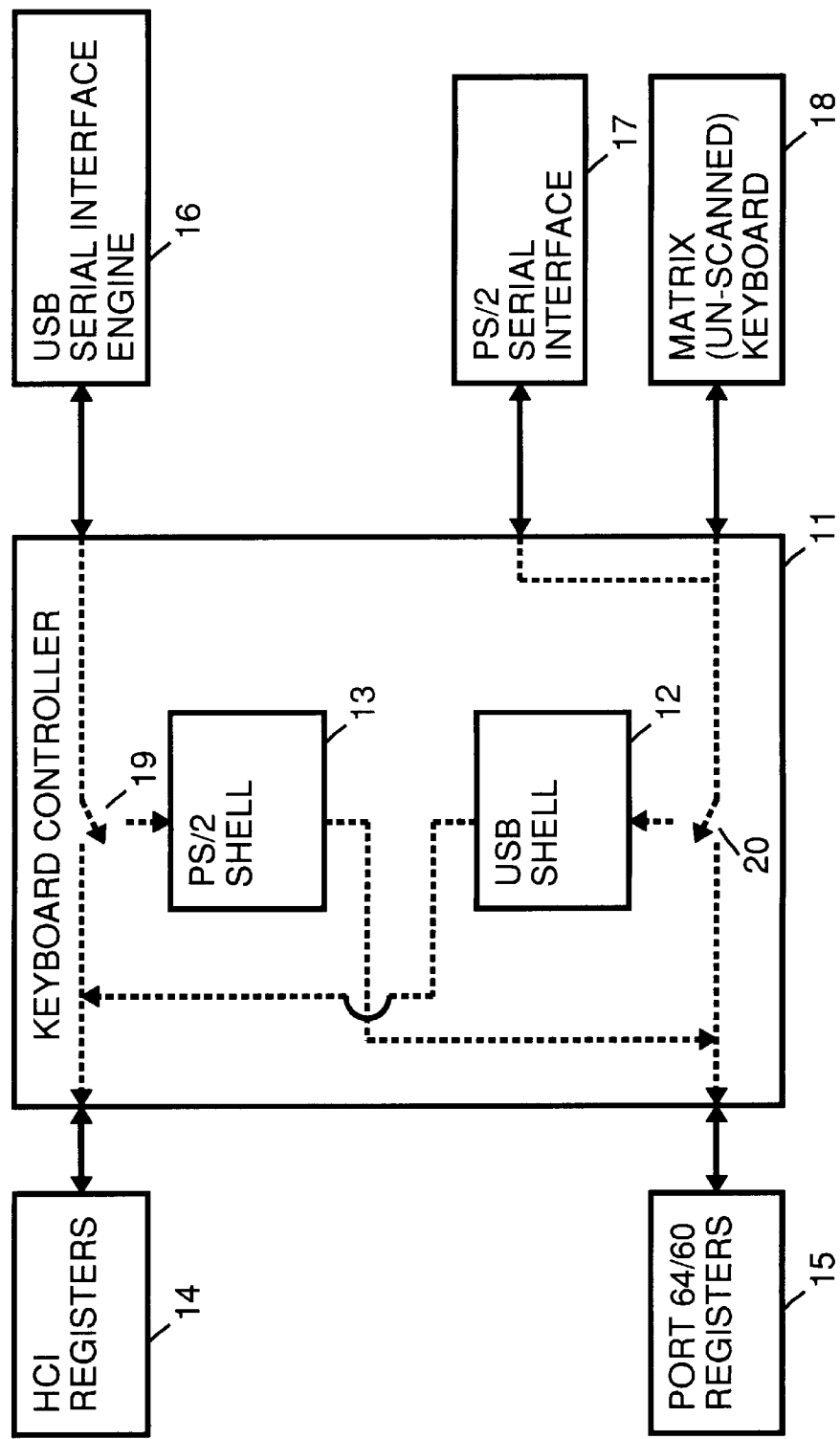
FIG. 1 shows a logic flow for a keyboard controller which supports both a universal serial interface and a PS/2 serial interface in accordance with the preferred embodiment of the present invention.

FIG. 1 shows a block diagram of logic flow through a keyboard controller 11 which supports both a universal serial bus (USB) interface and a PS/2 serial interface. Keyboard controller 11 receives input from a USB serial interface engine 16, a PS/2 serial interface 17, and/or matrix (unscanned) keyboard 18. Keyboard controller 11 interfaces with HCI registers 14 and/or a port 64/60 registers 15.

In a default mode a routing switch 19 and a routing switch 20 within keyboard controller 11 are set so that PS/2 serial interface 17 and any matrix (unscanned) keyboard 18 are connected to port 64/60 registers 15. USB serial interface engine 16 is routed through a PS/2 shell 13 to port 64/60 registers 15. PS/2 shell 13 allows USB devices connected to USB serial interface engine 16 to effectively communicate as PS/2 devices across port 64/60 registers 15.

If the operating system loads a USB driver, routing switch 19 and routing switch 20 within keyboard controller 11 are changed so that PS/2 serial interface 17 and any matrix (unscanned) keyboard 18 are routed through a USB shell 12 to HCI registers 14. USB serial interface engine is connected through to HCI registers 14. USB shell 12 allows PS/2 devices connected to PS/2 serial interface 17 and/or a matrix keyboard 18 to effectively communicate as USB devices across HCI registers 14.

Figure 2:
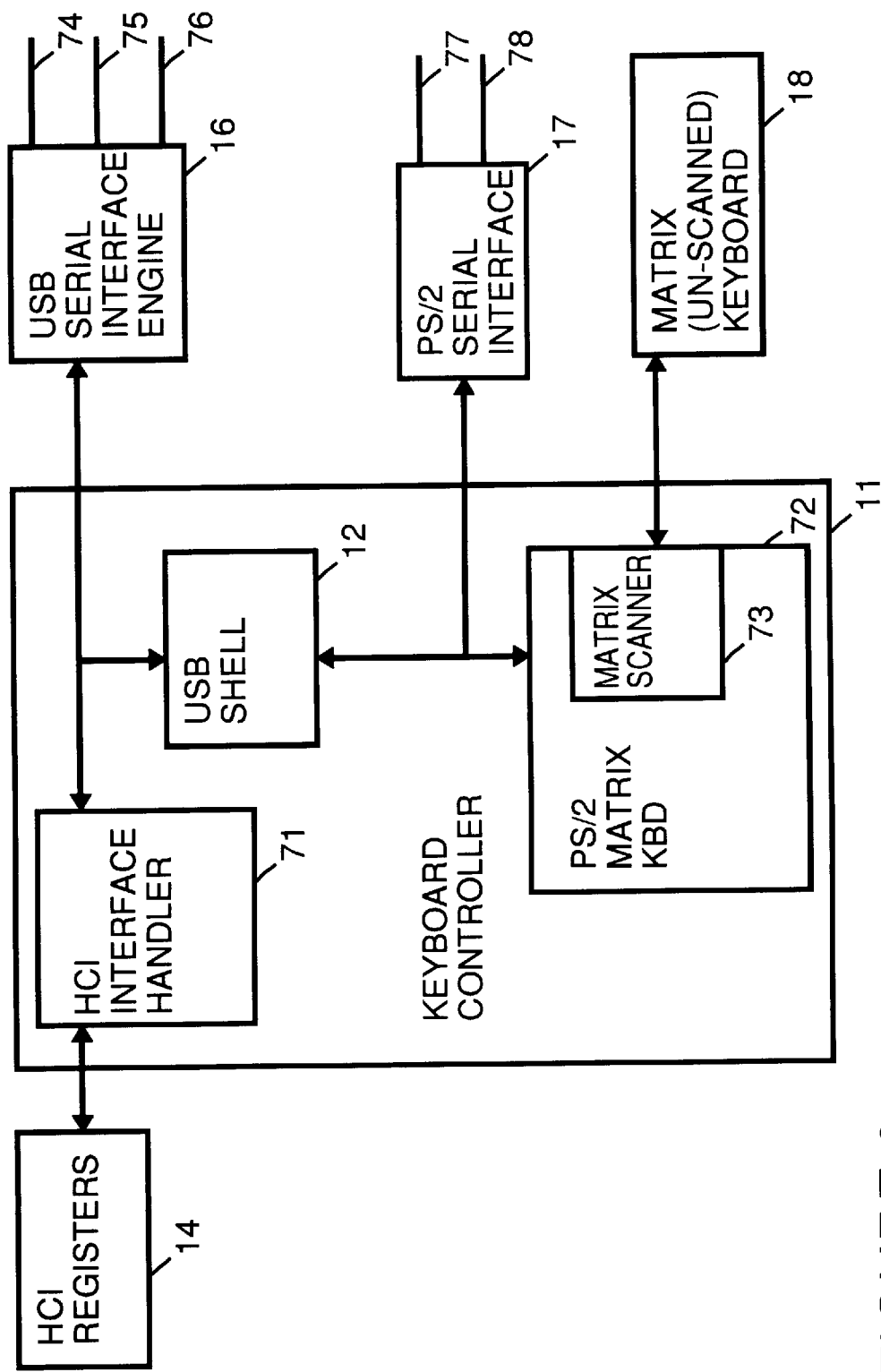
FIG. 2 shows logic flow for the keyboard controller shown in FIG. 1 when an HCI interface is active in accordance with the preferred embodiment of the present invention.

FIG. 2 shows logic flow for the keyboard controller 11 when the HCI interface is active. An HCI interface handler 71 within keyboard controller 11 interfaces with HCI registers 14. USB serial interface engine 16 handles information from three ports: a port 74, a port 75 and a port 76. On the host side, USB shell 12 interfaces with HCI interface handler 71. On the port side, USB shell 12 interfaces with PS/2 serial interface 17 and PS/2 matrix keyboard handler 72. PS/2 serial interface 17 has a keyboard port 77 and a mouse port 78. PS/2 matrix keyboard handler 72 includes a matrix scanner 73 for scanning matrix keyboard 18.

Figure 3:
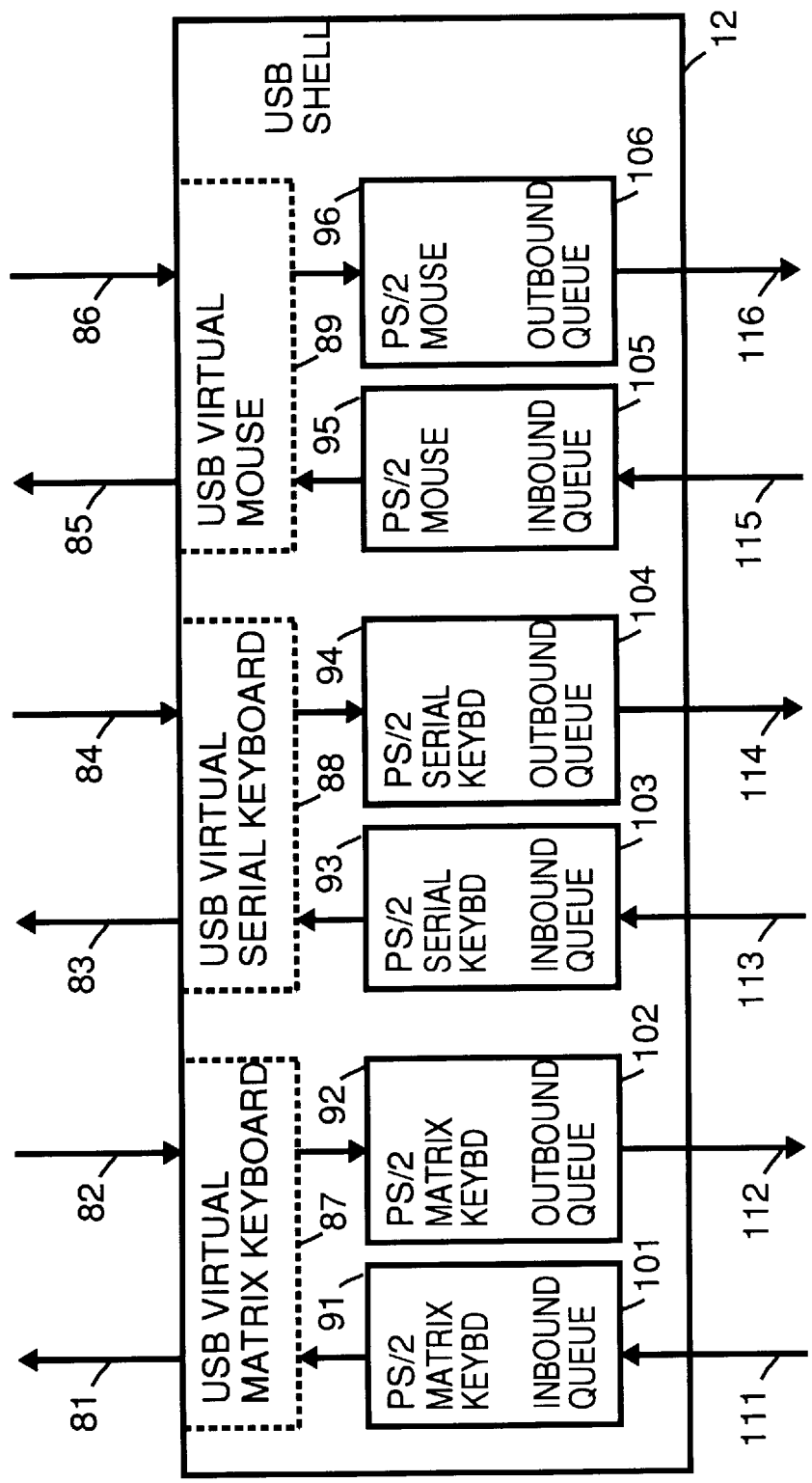
FIG. 3 shows a block diagram of a USB shell program in accordance with the preferred embodiment of the present invention.

FIG. 3 gives additional information of the operation of USB shell 12. USB shell 12 includes a USB virtual matrix keyboard block 87, a USB virtual serial keyboard block 88 and a USB virtual mouse block 89. PS/2 matrix keyboard inbound queue 101 queues PS/2 matrix keyboard inbound traffic 111 to be processed by USB virtual matrix keyboard 87 for transfer to HCI interface handler 71 along a data path 81. PS/2 matrix keyboard outbound queue 102 queues PS/2 matrix keyboard outbound traffic 112 received by USB virtual matrix keyboard 87 from HCI interface handler 71 along a data path 82.

PS/2 serial keyboard inbound queue 103 queues PS/2 serial keyboard inbound traffic 113 to be processed by USB virtual serial keyboard 88 for transfer to HCI interface handler 71 along a data path 83. PS/2 serial keyboard outbound queue 104 queues PS/2 serial keyboard outbound traffic 114 received by USB virtual serial keyboard 88 from HCI interface handler 71 along a data path 84.

PS/2 mouse inbound queue 105 queues PS/2 mouse inbound traffic 115 to be processed by USB virtual mouse 89 for transfer to HCI interface handler 71 along a data path 85. PS/2 mouse outbound queue 106 queues PS/2 mouse outbound traffic 116 received by USB virtual mouse 89 from HCI interface handler 71 along a data path 86.

Figure 4:
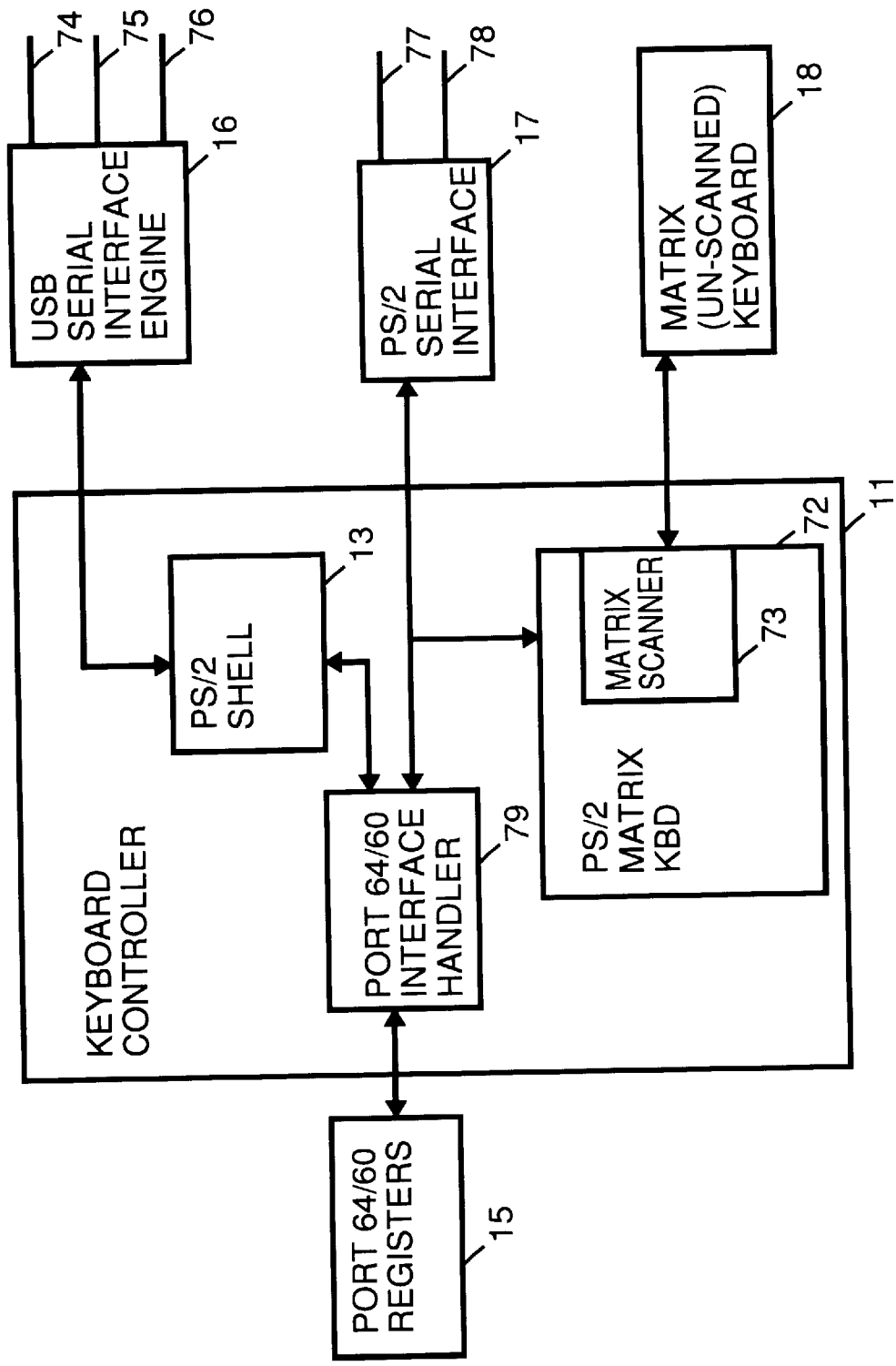
FIG. 4 shows logic flow for the keyboard controller shown in FIG. 1 when a Port 64/60 interface is active in accordance with the preferred embodiment of the present invention.

FIG. 4 shows logic flow for the keyboard controller 11 when the port 64/60 interface is active. A port 64/60 interface 79 within keyboard controller 11 interfaces with port 64/60 registers 15. On the host side, PS/2 shell 13 interfaces with port 64/60 registers 15. On the port side, PS/2 shell 13 interfaces with USB serial interface engine 16.

Figure 5:
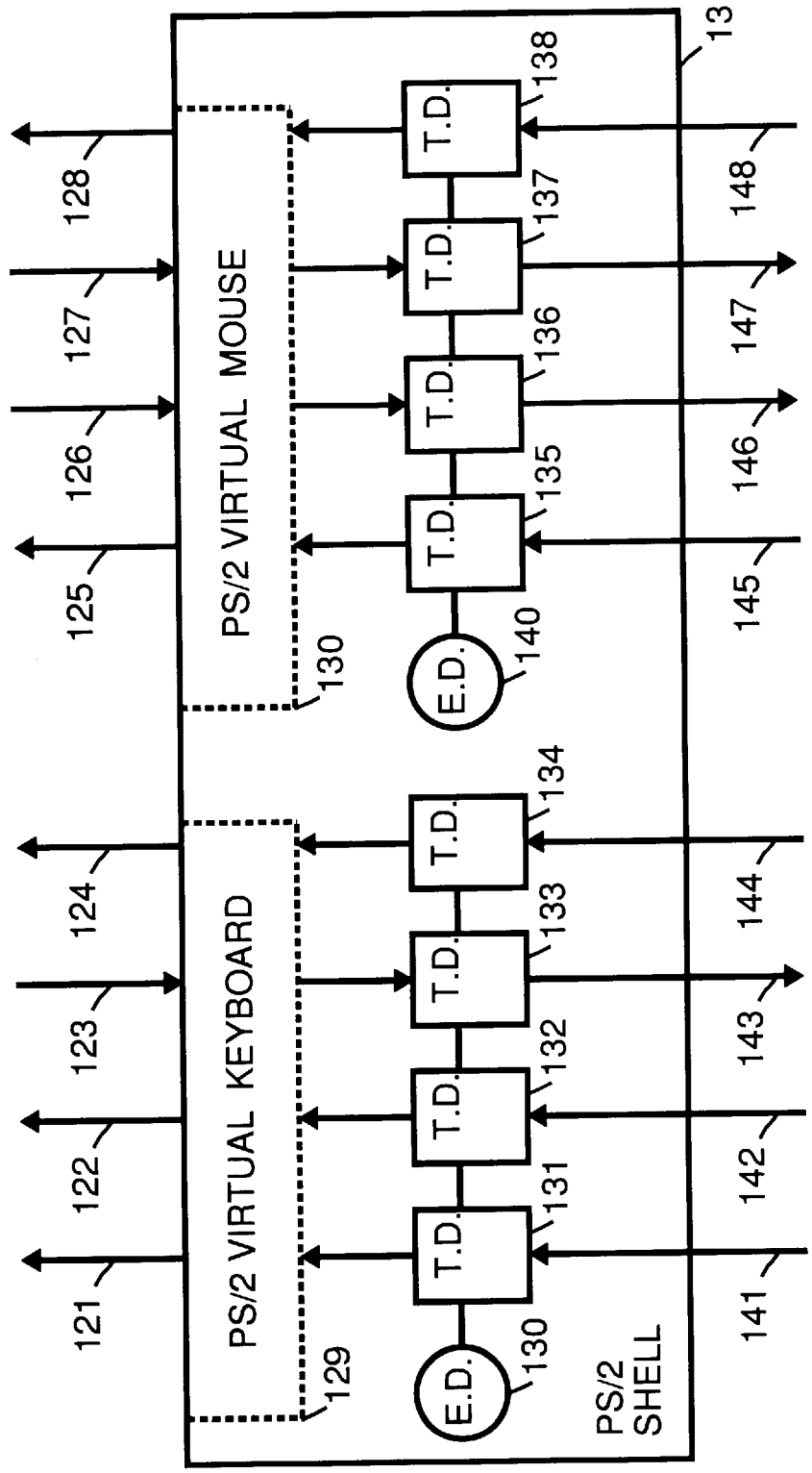
FIG. 5 shows a block diagram of a PS/2 shell program in accords with the preferred embodiment of the present invention.
Figure 6:
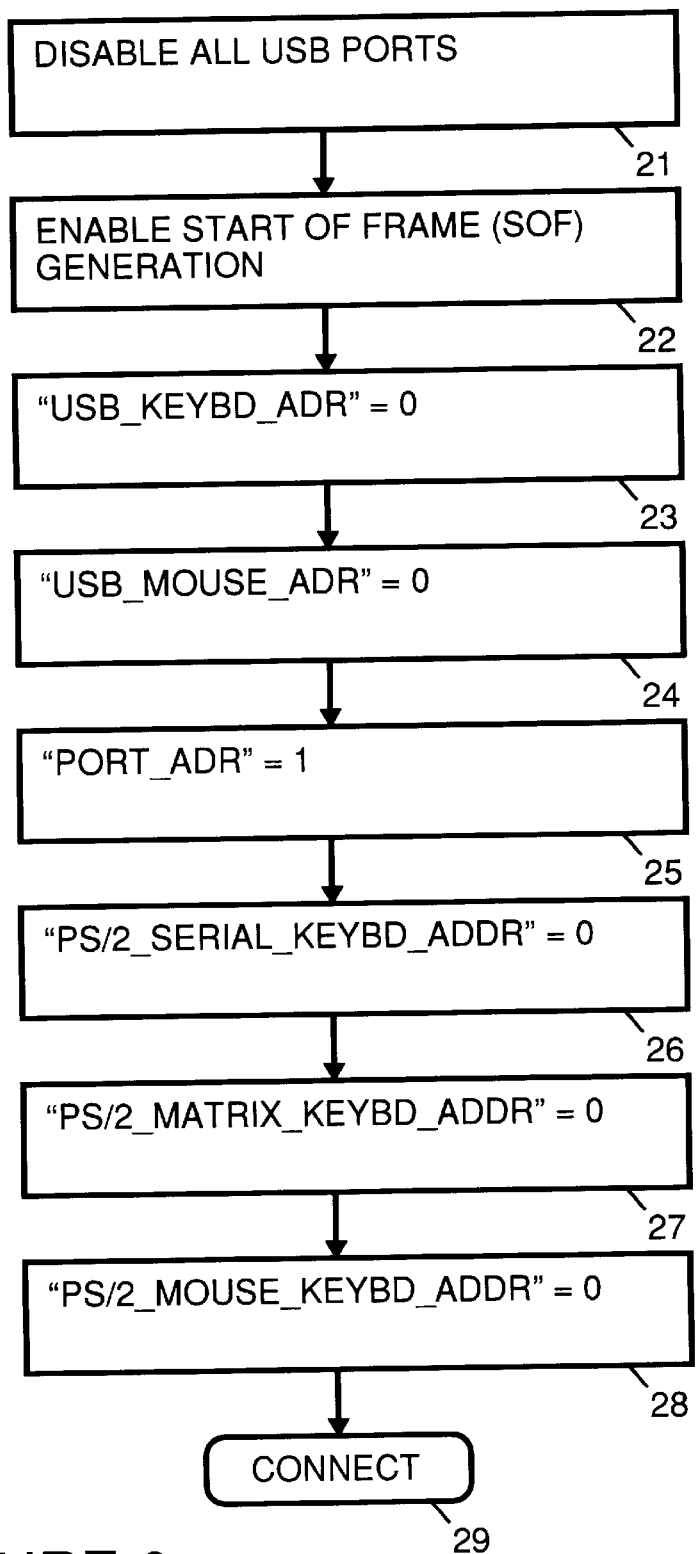
FIG. 6, FIG. 7, FIG. 8 and FIG. 9 are a flow chart which describes initialization of the keyboard controller shown in FIG. 1, in accordance with the preferred embodiment of the present invention.

FIG. 5 gives additional information of the operation of PS/2 shell 13. PS/2 shell 13 includes a PS/2 virtual serial keyboard block 129 and a PS/2 virtual mouse block 130. Inbound and outbound transactions for PS/2 virtual keyboard 129 are stored in a linked list of transfer descriptors. For example transfer descriptors 131, 132, 133 and 134 are shown. Transfer descriptor 131 includes inbound traffic 141 to be forwarded to port 64/60 registers 15 on a data path 121. Transfer descriptor 132 includes inbound traffic 142 to be forwarded to port 64/60 registers 15 on a data path 122. Transfer descriptor 133 includes outbound traffic 143 received from port 64/60 registers 15 on a data path 123. Transfer descriptor 134 includes inbound traffic 144 to be forwarded to port 64/60 registers 15 on a data path 124. An endpoint descriptor 130 is included at the end of the linked list of transfer descriptors.

Inbound and outbound transactions for PS/2 virtual mouse 130 are stored in a second linked list of transfer descriptors. For example transfer descriptors 135, 136, 137 and 138 are shown. Transfer descriptor 135 includes inbound traffic 145 to be forwarded to port 64/60 registers 15 on a data path 125. Transfer descriptor 136 includes outbound traffic 146 received from port 64/60 registers 15 on a data path 126. Transfer descriptor 137 includes outbound traffic 147 received from port 64/60 registers 15 on a data path 127. Transfer descriptor 138 includes inbound traffic 148 to be forwarded to port 64/60 registers 15 on a data path 128. An endpoint descriptor 140 is included at the end of the linked list of transfer descriptors.

FIG. 6, FIG. 7, FIG. 8 and FIG. 9 are a flow chart which describes initialization of keyboard controller 11 shown in FIG. 1, in accordance with the preferred embodiment of the present invention. In a step 21, which occurs at power-on, all USB ports are disabled. The preferred embodiment of the present invention supports three USB ports (i.e., USB ports 74, 75 and 76).

In a step 22 start of frame (SOF) generation is enabled. In a step 23, the USB keyboard device address is reset by resetting the variable "USB_KEYBD_ADR" to zero. In a step 24, the USB mouse device address is reset by resetting the variable "USB_MOUSE_ADR" to zero.

In a step 25, the variable "PORT_ADR" is set equal to one. The variable "PORT_ADR" is used to indicate the port currently being addressed. The three USB ports shown in FIGS. 2 and 3 are ports 74, 75 and 76. These are assigned port addresses (PORT_ADR) of 1, 2 and 3, respectively.

In a step 26, the PS/2 serial keyboard device address is reset by resetting the variable "PS/2_SERIAL_KBD_ADR" to zero. In a step 27, the PS/2 matrix keyboard device address is reset by resetting the variable "PS/2_MATRIX_KBD_ADR" to zero. In a step 28, the PS/2 mouse device address is reset by resetting the variable "PS/2_MOUSE_ADR" to zero. P/S2 devices, if found, will be assigned USB addresses. Since USB devices are point-to-point devices, the three possible PS/2 devices will "appear" on non-existent (virtual) ports, e.g., with port addresses of 4, 5 and 6. A connect 29 shows a connection between the flowchart from FIG. 6 to FIG. 7.

Figure 7:
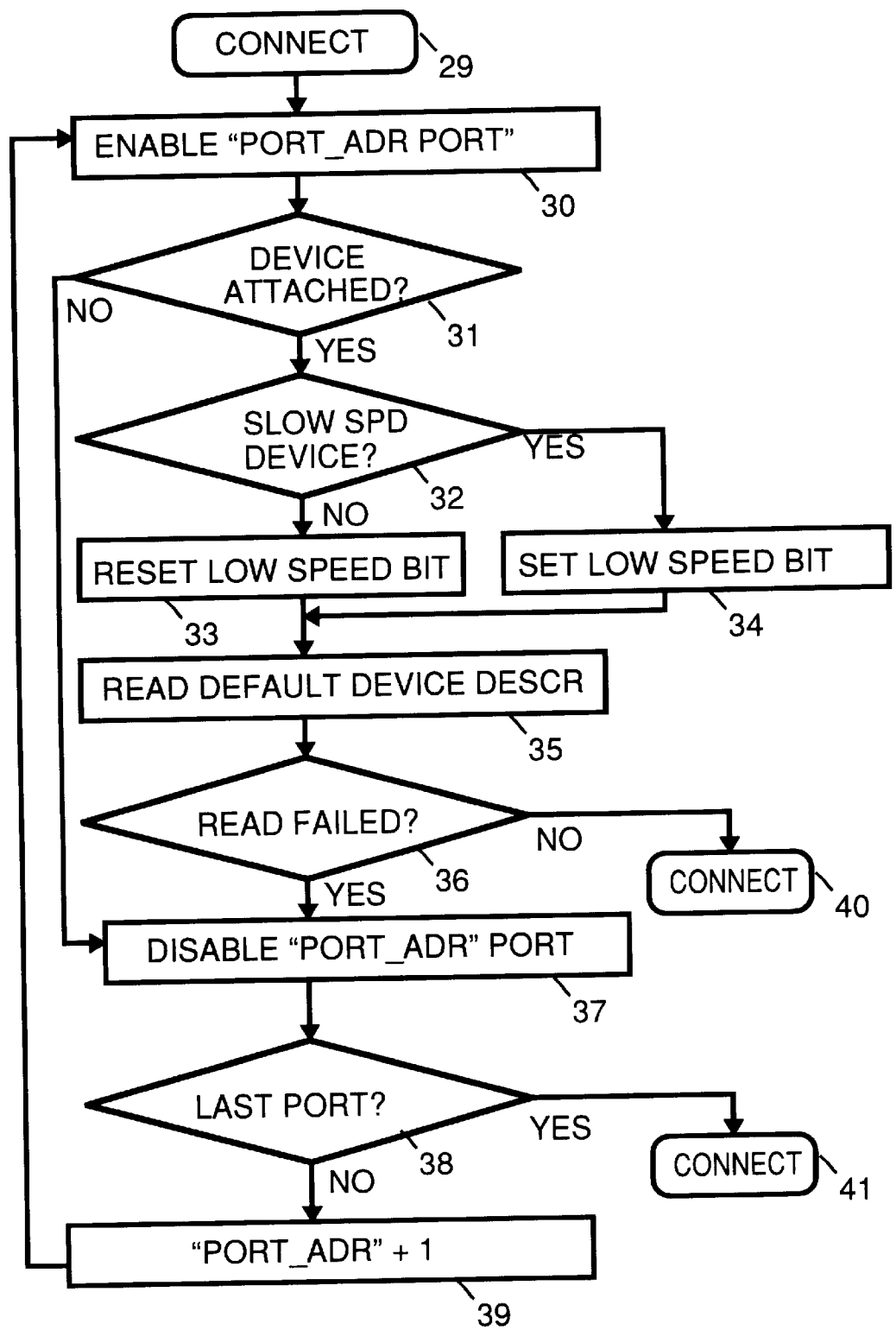

The flowchart portion shown in FIG. 7 starts with connect 29. In a step 30, the port specified by the variable "PORT_ADR" is enabled. In a step 31, a determination is made as to whether there is a device attached to the port specified by the variable "PORT_ADR". If not, program flow jumps to step 37.

If there is a device attached to the port specified by the variable "PORT_ADR", in a step 32, a determination is made as to whether the device attached to the port specified by the variable "PORT_ADR" is a slow speed device. If the device attached to the port specified by the variable "PORT_ADR" is a slow speed device, in a step 34, the low speed bit in the HcRhPortStatus register is set to logic one. If the device attached to the port specified by the variable "PORT_ADR" is not a slow speed device, in a step 33, the low speed bit in the HcRhPortStatus register is reset to logic zero.

In a step 35, the default device descriptor is read. This is a USB control transfer consisting of a setup, data and a status transaction. In a step 36 a determination is made as to whether the read of the default device descriptor in step 35 failed. If the read of the default device descriptor in step 35 did not fail, configuration continues via connect 40 to the portion of the flowchart shown in FIG. 8.

If the read of the default device descriptor in step 35 failed, in a step 37, the current port is turned off by disabling the current port specified by the variable "PORT_ADR".

In a step 38, a determination is made as to whether this is the last USB port (i.e., with a port address of 3). If this is not the last USB port, in a step 39, the variable "PORT_ADR" is incremented and configurations continues via a return to step 30. If, in step 39, a determination is made that this is the last USB port, configuration continues via connect 41 to the portion of the flowchart shown in FIG. 9.

Figure 8:
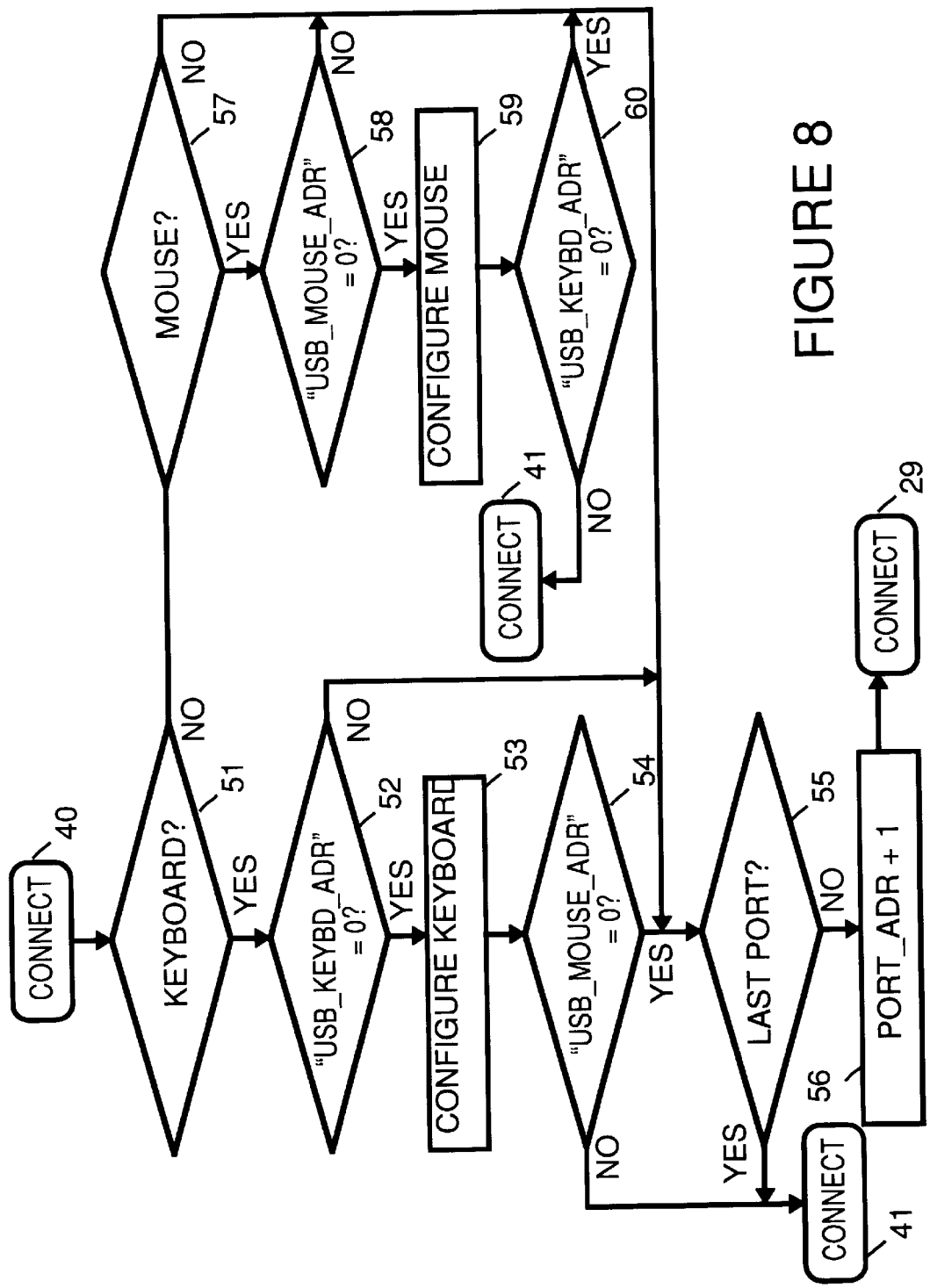

The flowchart portion shown in FIG. 8 starts with connect 40. The logic shown in FIG. 8 enables one USB keyboard (if found) and one USB mouse device (if found). In a step 51, a determination is made as to whether the default device is a keyboard. If so, in a step 52, a determination is made as to whether the variable "USB_KEYBD_ADR" equals zero. If the variable "USB_KEYBD_ADR" does not equal zero, this indicates that a USB keyboard has already been enabled. Therefore, since only one keyboard is allowed to be enabled, the flow jumps to step 55.

If in step 52 a determination is made that the variable "USB_KEYBD_ADR" equals zero, in a step 53, the keyboard is configured by setting the variable "USB_KEYBD_ADR" equal to the configuration address.

In a step 54, a determination is made as to whether the variable "USB_MOUSE_ADR" equals zero. If "USB_MOUSE_ADR" does not equal zero, this means that both a keyboard and a mouse have been enabled. Thus, configuration of the USB ports is done and configurations continues via connect 41 to the portion of the flowchart shown in FIG. 9.

If in step 54, it is determined that the variable "USB_MOUSE_ADR" equals zero, in a step 55, a determination is made as to whether this is the last USB port. If this is not the last USB port, in a step 56, the variable "PORT_ADR" is incremented and configurations continues via connect 29 to the portion of the flowchart shown in FIG. 6. If, in step 55, a determination is made that this is the last USB port, configuration continues via connect 41 to the portion of the flowchart shown in FIG. 9.

If in step 51 it is determined the default device is not the keyboard, in a step 57, a determination is made as to whether the default device is a mouse. If in step 57 it is determined that the default device is not a mouse, control jumps to step 55. If in step 57 it is determined that the default device is a mouse, in a step 58, a determination is made as to whether the variable "USB_MOUSE_ADR" equals zero. If the variable "USB_MOUSE_ADR" does not equal zero, this indicates that a USB mouse has already been enabled. Therefore, since only one mouse is allowed to be enabled, the flow jumps to step 55.

If in step 58 a determination is made that the variable "USB_MOUSE_ADR" equals zero, in a step 59, the keyboard is configured by setting the variable "USB_MOUSE_ADR" equal to the configuration address.

In a step 60, a determination is made as to whether the variable "USB_KEYBD_ADR" equals zero. If "USB_KEYBD_ADR" does not equal zero, this means that both a keyboard and a mouse have been enabled. Thus, configuration of the USB ports is done and configurations continues via connect 41 to the portion of the flowchart shown in FIG. 9.

If in step 60, it is determined that the variable "USB_KEYBD_ADR" equals zero, the flow continues at step 55.

Figure 9:
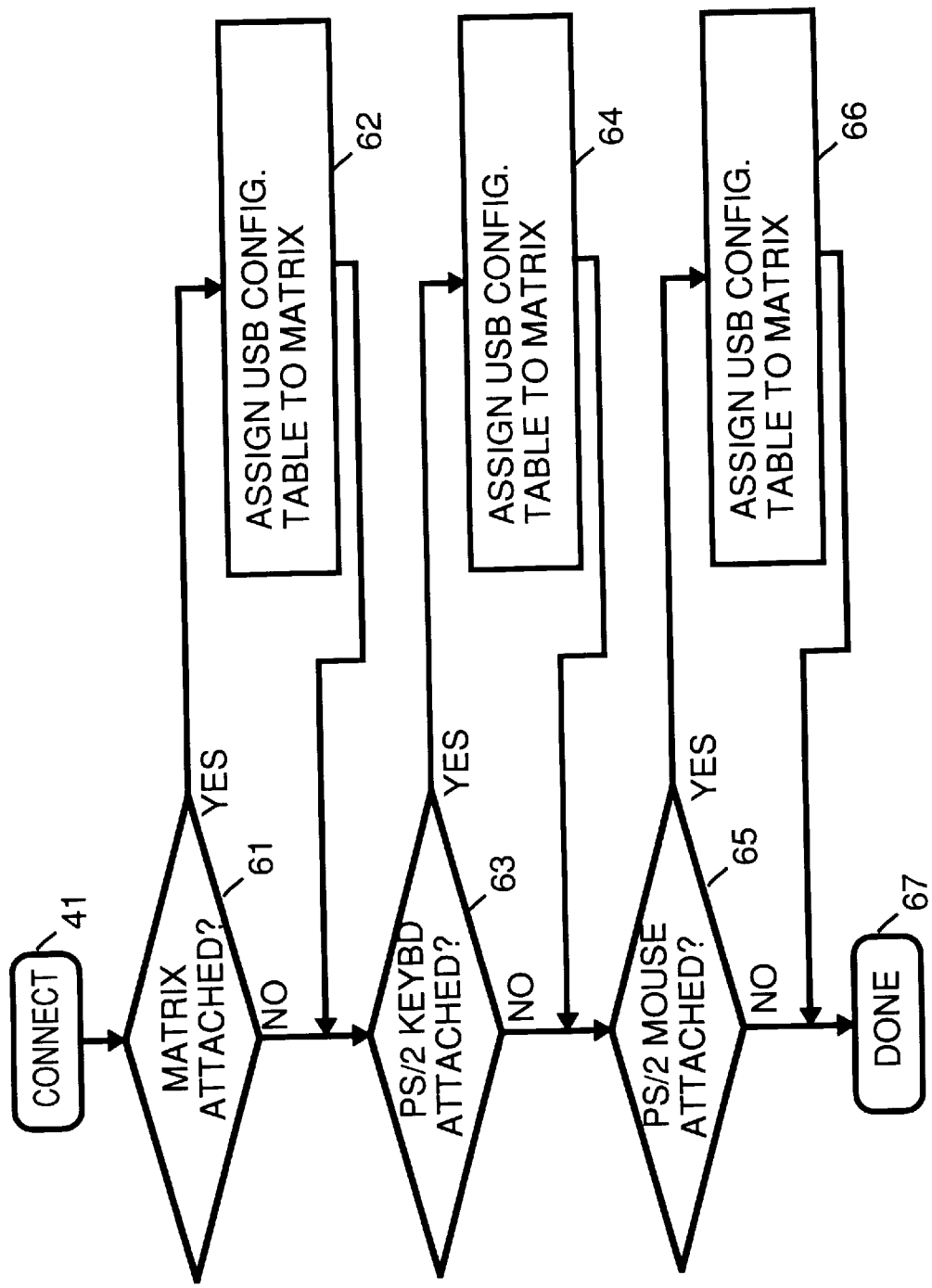

The flowchart portion shown in FIG. 9 starts with connect 41. The logic shown in FIG. 9 configures any PS/2 devices which are present. In a step 61 a determination is made as to whether a matrix keyboard is attached. If so, in a step 62, a USB configuration table is assigned to the matrix keyboard interface (A pin in the matrix keyboard interface is pulled low when the matrix keyboard is attached). The configuration table contains sufficient information to permit the emulation of a USB device by the matrix keyboard. The matrix keyboard appears on port 4. When it gets configured by the host's USB driver, the USB address assigned to the matrix keyboard is saved in the HCI interface handler. This address is needed so that traffic to the matrix keyboard is routed through USB shell 12.

In a step 63 a determination is made as to whether a serial keyboard is attached. If so, in a step 64, a USB configuration table is assigned to the serial keyboard interface (PS/2 echo commands are used to determine if a serial keyboard is plugged in). The configuration table contains sufficient information to permit the emulation of a USB device by the serial keyboard. The serial keyboard appears on port 5. When it gets configured by the host's USB driver, the USB address assigned to the serial keyboard is saved in the HCI interface handler. This address is needed so that traffic to the serial keyboard is routed through USB shell 12.

In a step 65 a determination is made as to whether a mouse is attached. If so, in a step 66, a USB configuration table is assigned to the mouse interface (PS/2 echo commands are used to determine if a mouse is plugged in). The configuration table contains sufficient information to permit the emulation of a USB device by the mouse. The mouse appears on port 6. When it gets configured by the host's USB driver, the USB address assigned to the mouse is saved in the HCI interface handler. This address is needed so that traffic to the mouse is routed through USB shell 12. Upon reaching step 67, initialization is complete.

Table 1 below sets out pseudo code which describes operation of port 64/60 interface handler 79.

TABLE 1

```
START:
    Execute PS/2 matrix scanner    /***Any keystrokes detected will be
                                      stored in the PS/2 matrix keyboard
                                      queue***/
    Read port 64                   /***The port 64/60 interface does not
                                      issue any kind of command
                                      requesting inbound traffic. Inbound
                                      traffic to the host is put in the port 60
                                      register when it is available and when
                                      port 60 is empty***/
    IF outbound traffic
        Reset "USB HOST ACTIVE" flag   /***This turns off the USB
                                          shell***/
        Go to OUTBOUND PS/2            /***This section sends
                                          traffic to an active PS/2
                                          device***/
    IF USB host active
        Go to PS/2 INBOUND to HCI      /***The USB shell is active
                                          so a check is made for
                                          inbound traffic. Any traffic
                                          will be posted to USB shell
                                          12***/
        Go to PS/2 USB to PORT 64/60   /***The PS/2 shell is active
                                          so a check is made for
                                          inbound traffic. Any traffic
                                          will be passed through to
                                          port 60.***/
OUTBOUND PS/2:
    IF Keyboard traffic
        IF USB Keyboard Active
            Go to PS/2 VIRTUAL         /***This sends traffic to the
                  KEYBD                   PS/2 virtual keyboard (i.e.,
                                          the USB keyboard as it
                                          appears in PS/2 shell 13).
                                          The traffic is handled
                                          as described below.***/
            Go to DONE                 /***This pass is
                                          complete***/
        IF PS/2 Keyboard Active
            Go to PS/2 KEYBD           /***This sends traffic to the
                                          PS/2 keyboard. The traffic
                                          is handled as in the
                                          customary manner.***/
            Go to DONE     /*This pass is complete*/
        Go to PS/2 MATRIX KEYBD /***This sends traffic to a
                                          routine which handles
                                          matrix keyboard traffic.***/
            Go to DONE     /*This pass is complete*/
```

TABLE 1-continued

```
IF Mouse traffic
    IF USB Mouse Active
        Go to PS/2 VIRTUAL       /***This sends traffic to the
        MOUSE                     PS/2 virtual mouse (i.e.,
                                  the USB mouse as it
                                  appears in PS/2 shell 13).
                                  The traffic is handled as
                                  similarly to the way the
                                  PS/2 virtual keyboard is
                                  implemented.***/
        Go to DONE               /***This pass is
                                  complete***/
    Go to PS/2 MOUSE             /***This sends traffic to the
                                  PS/2 mouse. The traffic is
                                  handled as in the customary
                                  manner.***/
    Go to DONE      /*This pass is complete*/
Process Keyboard controller      /***Traffic not directed to
command and/or data               either a keyboard or mouse
                                  is processed by the
                                  keyboard controller. The
                                  keyboard controller consists
                                  primarily of diagnostics and
                                  the turning on or of the
                                  keyboard or mouse
                                  interfaces.***/
    Go to DONE                   /***This pass is
                                  complete***/
PS/2 INBOUND to 64/60:           /***This routine checks
                                  PS/2 and USB devices for
                                  inbound traffic to port
                                  64/60 interface***/
    IF Port 60 NOT empty         /***Wait until data can be
                                  sent to the host via port 60
                                  before checking if any data
                                  is available***/
        Go to DONE               /***This pass is
                                  complete***/
    Access PS/2 virtual KBD in the  /***This checks if there is
    PS/2 shell                    any traffic from the USB
                                  keyboard***/
    IF inbound traffic
        Get next character from transfer descriptor
        Translate from USB to PS/2 code
        Put code in Port 60
        Reset all active Keyboard Flags
        Set "USB KBD ACTIVE"
        Update transfer descriptor pointer
        Go to DONE         /*This pass is complete*/
    Access PS/2 virtual mouse in  /***This checks if there is
    the PS/2 shell                any traffic from the USB
                                  mouse***/
    IF inbound traffic
        Get next character from transfer descriptor
        Translate from USB to PS/2 code
        Put code in Port 60
        Reset "PS/2 MOUSE ACTIVE" Flag
        Set "USB MOUSE ACTIVE"
        Update transfer descriptor pointer
        Go to DONE         /*This pass is complete*/
    Access PS/2 interface registers /***This checks if there is
                                   any serial keyboard PS/2
                                   traffic***/
    IF PS/2 Serial Keyboard traffic
        Put code in Port 60
        Set "PS/2 KBD ACTIVE" Flag
        Reset all other active KBD Flags
        Go to DONE         /*This pass is complete*/
    IF PS/2 Mouse Keyboard traffic
        Put code in Port 60
        Set "PS/2 MOUSE ACTIVE" Flag
        Reset "USB MOUSE ACTIVE" Flag
        Go to DONE         /*This pass is complete*/
    READ PS/2 Matrix Queue
    IF inbound traffic
        Put code in Port 60
        Set "PS/2 MATRIX ACTIVE" Flag
        Reset all other active KBD Flags
        Go to DONE         /*This pass is complete*/
```

TABLE 1-continued

```
PS/2 INBOUND to HCI:             /***This routine checks PS/2 and
                                  USB devices for inbound traffic to
                                  the HCI interface***/
    Read PS/2 Serial Interface   /*USB shell is active*/
    IF PS/2 Serial Keyboard Traffic
        Queue PS/2 code to PS/2 Matrix Inbound Queue in USB
            Shell 13.
        Go to HCI OUTBOUND to PS/2
    IF PS/2 Mouse Traffic
        Queue PS/2 code to PS/2 Mouse Inbound Queue in USB
            Shell 13.
        Go to HCI OUTBOUND to PS/2
    Read PS/2 Matrix keyboard queue
    IF Data Available
        Queue PS/2 code to PS/2 Serial Keyboard Inbound Queue in
            USB Shell 13
        Go to HCI OUTBOUND to PS/2
HCI OUTBOUND to PS/2
    IF PS/2 Matrix Keyboard Outbound Queue has data
        Send DATA to PS/2 MATRIX KEYBOARD
    IF PS/2 Serial Keyboard Outbound Queue has data
        Send DATA to PS/2 SERIAL KEYBOARD
    IF PS/2 Mouse Outbound Queue has data
        Send DATA to PS/2 MOUSE
DONE:                            /*This is the end of the routine*/
    EXIT ROUTINE.
```

Table 2 below sets out pseudo code which describes operation of USB virtual serial keyboard block 88 as it appears in PS/2 shell 12.

TABLE 2

```
PS/2 VIRTUAL KEYBD:
    IF Not Command              /***This checks Port 64 for
                                    status***/
        IF Command Operation in Progress
            Go to GET DATA BYTE
        Post "RESEND" Response   /***This is posted to Port
                                    60***/
        Go to DONE               /*This pass is complete*/
    IF Not a Valid Command       /***Valid commands are
                                    numbered from ED through
                                    FF***/
        Post "RESEND" Response   /***This is posted to Port
                                    60***/
        Go to DONE               /*This pass is complete*/
    IF INDICATOR COMMAND         /Command ED***/
        Post "ACK" Response      /*Posted to Port 60*/
        "Command-In-Progress = "Indicators"
        Go to DONE               /*This pass is complete*/
    IF READ_ID COMMAND           /Command F2***/
        Post "ACK" Response      /*Posted to Port 60*/
        Post Keyboard ID         /***There are several bytes of
                                    storage maintained in this
                                    logic for storing such things
                                    as multi-byte scan code
                                    translations and command
                                    responses (i.e. keyboard
                                    ID's)
        Go to DONE               /*This pass is complete*/
    IF ENABLE COMMAND            /Command F4***/
        Post "ACK" Response      /*Posted to Port 60*/
        Set "Scanning" Flag
        Go to DONE               /*This pass is complete*/
    IF DISABLE COMMAND           /Command F5***/
        Post "ACK" Response      /*Posted to Port 60*/
        Reset "Scanning" Flag
        Go to DONE               /*This pass is complete*/
    IF RESEND COMMAND            /*Command FE*/
        Resend "LAST_CHAR"       /***Posted to Port 60. Every
                                    time a character is loaded
                                    into port 60 it is also saved
                                    in "LAST_CHAR" in case
                                    the host issues a resend
                                    command.***/
```

TABLE 2-continued

```
        Go to DONE                 /*This pass is complete*/
    IF SELECT SCAN CODE            /*Command F0*/
    TABLE
        Post "ACK" Response        /*Posted to Port 60*/
        "COMMAND_IN_PROGRESS" = "SCANCODE_TBL"
        Go to DONE                 /*This pass is complete*/
    IF SELECT TYPEMATIC            /Command F3***/
    RATE
        Post "ACK" Response        /*Posted to Port 60*/
        "COMMAND_IN_PROGRESS" = "TYPE_RATE"
        Go to DONE                 /*This pass is complete*/
    IF RESET                       /*Commmand FF*/
        Construct "Reset" transfer descriptor
                                   /***empty transfer descriptors
                                      reside in the PS/2 shell
                                      and are attached to the USB
                                      keyboard's endpoint
                                      descriptor. They are filled-
                                      in as needed.***/
        Construct Reset Response transfer descriptor
        Attach transfer descriptor to PS/2 endpoint descriptor
        Go to DONE                 /*This pass is complete*/
        Post 'ACK' Response        /**Ignore USB unsupported
                                      stuff**/
        Go to DONE                 /*This pass is complete*/
GET DATA BYTE:
    Get a data byte                /*Read Port 60*/
    IF Indicator Operation
        Construct "Indicator" Transfer Descriptor
        Construct Indicator Response transfer descriptor
        Attach transfer descriptor to PS/2 endpoint descriptor
        Go to DONE                 /*This pass is complete*/
        Post 'ACK' Response        /**Ignore Typematic rate, and
                                      scan code table
                                      operations***/
DONE:                              /***This is the end of the
                                      routine***/
    EXIT ROUTINE.
```

Table 3 below sets out pseudo code which describes operation of HCI interface handler 71.

TABLE 3

```
START HCI INTERFACE:
    IF NOT USB Operational State
        Go to USB INACTIVE  /***USB traffic is normally disabled
                                until the controller is put into
                                the USB operational state by the
                                Host***/
    Set "USB Host Active" Flag
PROCESS NEXT LIST:                 /*An entry point from below*/
    IF Process Periodic lists
        IF Not Last Endpoint Descriptor processed
            Get next Endpoint Descriptor from Periodic List
            Get next Transfer Descriptor (From Endpoint)
    ELSE
        Get next Endpoint Descriptor from Non-Periodic List
        Get next Transfer Descriptor (From Endpoint)
    IF Transfer Descriptor Exists
        IF PS/2 Device
            Go to PS/2 DEVICE HANDLER
            Perform transfer on USB Wire
COMPLETE TRANSFER                  /***This is a return point for PS/2
                                      DEVICE HANDLER***/
    IF transfer complete
        Put Transfer Descriptor in Done Queue
    IF Not End of Frame
        Go to PROCESS NEXT LIST
DONE:                              /*This is the end of the routine*/
    EXIT ROUTINE.
PS/2 DEVICE HANDLER:
    IF PS/2 Matrix Address
        IF Inbound Transaction
            IF PS/2 Matrix Inbound Queue Empty
                Go to            /***This is a "NACK" response.
                COMPLETE           No changes are made to the
```

TABLE 3-continued

```
                TRANSFER           Transfer Descriptor***/
            Get Data from queue and put in Transfer Descriptor
            Post good completion transfer descriptor
            Go to COMPLETE TRANSFER
        Translate USB Data to PS/2 Data
        Post data to PS/2 Matrix outbound queue
        Post good completion transfer descriptor
        Go to COMPLETE TRANSFER
    IF PS/2 Serial Keyboard Address
        IF Inbound Transaction
            IF PS/2 Serial KBD Inbound Queue Empty
                Go to            /***This is a "NACK" response.
                COMPLETE           No changes are made to the
                TRANSFER           Transfer Descriptor***/
            Get Data from queue and put in Transfer Descriptor
            Post good completion transfer descriptor
            Go to COMPLETE TRANSFER
        Translate USB KBD Data to PS/2 Data
        Post data to PS/2 Serial outbound queue
        Post good completion transfer descriptor
        Go to COMPLETE TRANSFER
    IF Inbound Transaction
        IF PS/2 Mouse Inbound Queue Empty
            Go to COMPLETE   /***This is a "NACK" response.
            TRANSFER           No changes are made to the
                               Transfer Descriptor***/
        Get Data from queue and put in Transfer Descriptor
        Post good completion transfer descriptor
        Go to COMPLETE TRANSFER
    Translate USB Mouse Data to PS/2 Data
    Post data to PS/2 Mouse outbound queue
    Post good completion transfer descriptor
    Go to COMPLETE TRANSFER
USB INACTIVE:                      /***USB Host is Asleep (or non-
                                      existent?). Process any PS/2
                                      Host traffic***/
    Get PS/2 Virtual Keyboard Endpoint Descriptor
                                   /***This Endpoint Descriptor
                                      and any attached Transfer
                                      Descriptors reside in PS/2 shell
                                      13***/
    IF any Transfer Descriptors connected to Endpoint Descriptor
        Get next Transfer Descriptor
        Perform transfer on USB wire
        IF transfer complete
            Put Transfer Descriptor in Done queue
        Get PS/2 Virtual mouse End descriptor
                                   /***This Endpoint Descriptor
                                      and any attached Transfer
                                      Descriptors reside in PS/2 shell
                                      13***/
    IF any Transfer Descriptors connected to Endpoint Descriptor
        Get next Transfer Descriptor
        Perform transfer on USB wire
        IF transfer complete
            Put Transfer Descriptor in Done queue
        IF End of Frame
            Go to DONE       /*This pass is complete*/
    Go to USB INACTIVE
```

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for connecting a first keyboard/mouse interface and a second keyboard/mouse interface to a host computer, the method comprising the steps of:

(a) routing data between the first keyboard/mouse interface and a first keyboard controller-to-host interface when the first keyboard controller-to-host interface is active;

(b) routing data between the first keyboard/mouse interface and a first shell when a second keyboard controller-to-host interface is active, the first shell providing compatible connection between the first keyboard/mouse interface and the second keyboard controller-to-host interface;

(c) routing data between the second keyboard/mouse interface and the second keyboard controller-to-host interface when the second keyboard controller-to-host interface is active; and, (d) routing data between the second keyboard/mouse interface and a second shell when the first keyboard controller-to-host interface is active, the second shell providing compatible connection between the second keyboard/mouse interface and the first keyboard controller-to-host interface.

2. A method as in claim 1 wherein in steps (a) through (d):

the first keyboard/mouse interface comprises a universal serial bus serial interface;

the second keyboard/mouse interface comprises a PS/2 serial interface;

the first keyboard controller-to-host interface comprises a host controller interface; and the second keyboard controller-to-host interface comprises a port 64/60 interface.

3. A method as in claim 2 wherein in steps (a) through (d):

the second keyboard/mouse interface additionally comprises a matrix keyboard interface.

4. A method as in claim 1 wherein step (d) comprises the following substeps:

(d.1) storing serial keyboard data traveling from the second keyboard/mouse interface to the first keyboard controller-to-host interface in a serial keyboard inbound queue;

(d.2) storing serial keyboard data traveling from the first keyboard controller-to-host interface to the second keyboard/mouse interface in a serial keyboard outbound queue;

(d.3) storing mouse data traveling from the second keyboard/mouse interface to the first keyboard controller-to-host interface in a mouse inbound queue; and, (d.4) storing mouse data traveling from the first keyboard controller-to-host interface to the second keyboard/mouse interface in a mouse outbound queue.

5. A method as in claim 4 wherein step (d) additionally comprises the following substeps:

(d.5) storing matrix keyboard data traveling from the second keyboard/mouse interface to the first keyboard controller-to-host interface in a matrix keyboard inbound queue; and, (d.6) storing matrix keyboard data traveling from the first keyboard controller-to-host interface to the second keyboard/mouse interface in a matrix keyboard outbound queue.

6. A method as in claim 1 wherein step (b) additionally comprises the following substeps:

(b.1) storing serial keyboard data traveling between the first keyboard/mouse interface and second keyboard controller-to-host interface in a first linked list of transfer descriptors; and, (b.2) storing mouse data traveling between the first keyboard/mouse interface and second keyboard controller-to-host interface in a second linked list of transfer descriptors.

7. A keyboard controller for connecting a first keyboard/mouse interface and a second keyboard/mouse interface to a host computer, the keyboard controller comprising:

a first data path for connecting the first keyboard/mouse interface to a first keyboard controller-to-host interface of the host;

a second data path for connecting the second keyboard/mouse interface to a second keyboard controller-to-host interface of the host;

a first shell for providing compatible connection between the first keyboard/mouse interface and the second keyboard controller-to-host interface; and, a second shell for providing compatible connection between the second keyboard/mouse interface and the first keyboard controller-to-host interface.

8. A keyboard controller as in claim 7 wherein:

the first keyboard/mouse interface comprises a universal serial bus serial interface;

the second keyboard/mouse interface comprises a PS/2 serial interface;

the first keyboard controller-to-host interface comprises a host controller interface; and the second keyboard controller-to-host interface comprises a port 64/60 interface.

9. A keyboard controller as in claim 8 wherein the second keyboard/mouse interface additionally comprises a matrix keyboard interface.

10. A keyboard controller as in claim 7 additionally comprising:

a first routing means for routing data between the first keyboard/mouse interface and the first keyboard controller-to-host interface when the first keyboard controller-to-host interface is active and for routing data between the first keyboard/mouse interface and the first shell when the second keyboard controller-to-host interface is active; and, a second routing means for routing data between the second keyboard/mouse interface and the second keyboard controller-to-host interface when the second keyboard controller-to-host interface is active and for routing data between the second keyboard/mouse interface and the second shell when the first keyboard controller-to-host interface is active.

11. A keyboard controller as in claim 7 wherein the second shell comprises:

a virtual serial keyboard;

a serial keyboard inbound queue;

a serial keyboard outbound queue;

a virtual mouse;

a mouse inbound queue; and, a mouse outbound queue.

12. A keyboard controller as in claim 11 wherein the second shell additionally comprises:

a virtual matrix keyboard;

a matrix keyboard inbound queue; and, a matrix keyboard outbound queue.

13. A keyboard controller as in claim 7 wherein the first shell comprises:

a virtual keyboard;

a first linked list of transfer descriptors, which includes an endpoint descriptor;

a virtual mouse; and, a second linked list of transfer descriptors, which includes an endpoint descriptor.

* * * * *